United States Patent [19]

Loew

[11] 4,146,712
[45] Mar. 27, 1979

[54] PROCESS FOR THE MANUFACTURE OF COUMARIN DYES

[75] Inventor: Peter Loew, Münchenstein, Switzerland

[73] Assignee: Ciba-Geigy Corporation, Ardsley, N.Y.

[21] Appl. No.: 770,493

[22] Filed: Feb. 22, 1977

[30] Foreign Application Priority Data

Mar. 11, 1976 [CH] Switzerland .................. 3035/76
Mar. 11, 1976 [CH] Switzerland .................. 3036/76

[51] Int. Cl.² ................................. C07D 277/62
[52] U.S. Cl. ................................. 544/135; 544/137; 544/368; 260/304 T; 260/307 D; 546/198
[58] Field of Search ........ 260/304 T, 307 D, 293.57, 260/293.58; 544/135, 137, 368

[56] References Cited

U.S. PATENT DOCUMENTS 3,014,041 12/1961 Hausermann et al. ........... 260/304 T
4,055,568 10/1977 Patsch et al. .................... 260/293.58

OTHER PUBLICATIONS

Borsche et al., *Berichte*, 37, 3163–3167 (1904).

*Primary Examiner*—Nicholas S. Rizzo
*Attorney, Agent, or Firm*—Prabodh I. Almaula

[57] ABSTRACT

A process for the manufacture of coumarin dyes of the formula

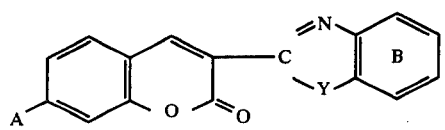

wherein Y represents a sulphur or an oxygen atom and the ring B can carry non-ionogenic substituents or substituted or unsubstituted fused rings, and A represents a hydrogen atom, a hydroxyl, alkoxy or phenoxy group, a nitrogen-containing heterocyclic ring system which is fused to two carbon atoms or represents a group —NR₁R₂, in which R₁ represents a substituted or unsubstituted alkyl or phenyl group, R₂ represents a hydrogen atom or has one of the meanings assigned to R₁, or R₁ and R₂ together with the nitrogen atom to which they are attached represent a 5- or 6-membered ring system, which process comprises condensing heterocyclic products of the formula

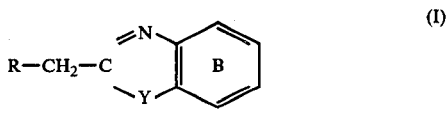

wherein R represents a —CN—,—COOR' or

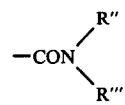

group, in which R' represents a substituted or unsubstituted alkyl or aryl group and each of R" and R"' independently can be the same as R' or a hydrogen atom, or together with the nitrogen atom to which they are attached form a heterocyclic 5- or 6-membered ring, and Y and B are as defined above, with the proviso that, if Y represents a sulphur atom, the reaction mixture consisting of malodinitrile and o-aminothiophenols is used as starting material, in the presence of an organic solvent and a catalytic amount of a strong acid, with an aldehyde of the formula

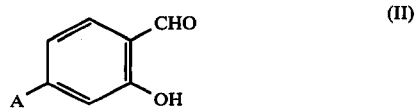

wherein A is as defined above.

8 Claims, No Drawings

PROCESS FOR THE MANUFACTURE OF COUMARIN DYES

The invention provides a process for the manufacture of fluorescing coumarin dyes which comprises condensing heterocyclic products of the formula

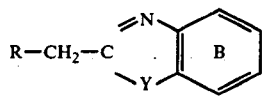

wherein R represents a —CN, —COOR' or

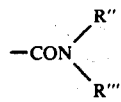

group, in which R' represents a substituted or unsubstituted alkyl or aryl group and each of R" and R''' independently can be the same as R' or a hydrogen atom or together with the nitrogen atom to which they are attached form a heterocyclic 5- or 6-membered ring, Y represents a sulphur or an oxygen atom and the ring B can carry non-ionogenic substituents or substituted or unsubstituted fused rings, in the presence of an organic solvent and a catalytic amount of a strong acid, with an aldehyde of the formula

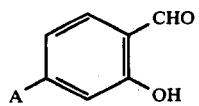

which is substituted in the ortho-position and wherein A represents a hydrogen atom, a hydroxyl, alkoxy or phenoxy group, a nitrogen-containing heterocyclic ring which is fused to two carbon atoms, or preferably represents a group —NR$_1$R$_2$, in which R$_1$ represents a substituted or unsubstituted alkyl or phenyl group, R$_2$ represents a hydrogen atom or has one of the meanings assigned to R$_1$, or R$_1$ and R$_2$ together with the nitrogen atom to which they are attached represent a heterocyclic 5- or 6-membered ring system, to give the coumarin dye of the formula

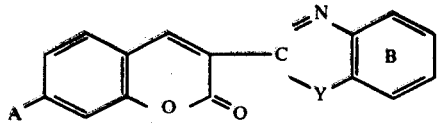

wherein A, Y and B are as defined above, with the proviso that, if Y represents a sulphur atom, the reaction mixture consisting of malodinitile and o-aminothiophenols can be used as starting material.

All the alkyl groups in the molecule preferably contain 1, 2, 3 or 4 carbon atoms and can carry as substituents for example one or more halogen atoms, by which are meant here in general especially chlorine or bromine atoms, lower alkoxy groups (for example methoxy, ethoxy, propoxy, butoxy groups), hydroxyl groups, cyano, vinyl, amino, lower alkylamino, phenyl, phenoxy, acyl, acyloxy or acylamino groups. Unsubstituted methyl and ethyl groups are particularly preferred.

All phenyl groups in the molecule, and also the phenyl nucleus B, can carry the substituents referred to above and, for example, in addition alkyl and nitro groups.

A heterocyclic ring system represented by R$_1$ and R$_2$ together with the nitrogen atom to which they are attached is to be understood as meaning in general a 5- or 6-membered ring which (as described above) is substituted for unsubstituted and which, in addition to the =CH and —CH$_2$ groups, can contain further heteroatoms, in particular sulphur or nitrogen atoms as well as substituents, and can be saturated, unsaturated or of aromatic character. Such a ring is chiefly the piperidine, piperazine, N-acylpiperazine (such as N-acetyl- or N-formylpiperazine), pyrrolidine, morpholine and N-alkylpiperazine (such as N-methylpiperazine or N-ethylpiperazine) ring.

Preferred acyl groups are those of the formula R$_3$—Y'— or R$_3$—Z—, wherein R$_3$ represents a hydrocarbon radical which can carry the substituents referred to above and/or heteroatoms, preferably a substituted or unsubstituted alkyl or phenyl group. Y' represents a radical —O—CO—, —SO$_2$— or —O—SO$_2$—, Z represents a radical —CO—, —NR$_4$CO— or —NR$_4$SO$_2$—, wherein R$_4$ represents a hydrogen atom or has the meaning assigned to R$_3$.

The manufacture of compounds of the formula

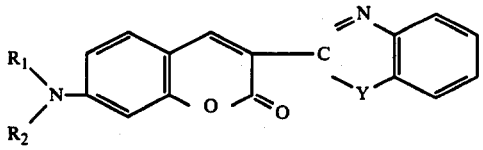

is of particular interest, wherein R$_1$ represents an alkyl group of 1 to 4 carbon atoms which can be substituted by hydroxyl, vinyl, cyano, alkoxy, formyloxy, alkylcarbonyloxy, alkoxycarbonyloxy or alkoxycarbonyl, and R$_2$ represents a hydrogen atom or has one of the meanings assigned to R$_1$, while suitable values for R$_1$ and R$_2$ are in particular methyl, ethyl, propyl, butyl, alkyl, β-chloroethyl, γ-chloro-β-hydroxypropyl, β-hydroxyethyl, β-cyanoethyl, γ-cyanopropyl, β-methoxyethyl, β-acetoxyethyl, β-butyryloxyethyl, methoxycarbonylethyl, ethoxycarbonylethyl, phenylethyl or benzyl, and Y is as defined above.

The term "lower" whenever used herein in connection with definitions such as alkyl, alkoxy, carbalkoxy etc., denotes that the alkyl moieties occurring in the radical contain from 1 to 4 carbon atoms.

The starting products are themselves known. As examples of such compounds there may be mentioned: benzoxazolyl acetonitrile, benzoxazolyl acetate, benzoxazolyl acetamide, methylbenzoxazolyl acetonitrile, dimethylbenzoxazolyl acetonitrile, chlorobenzoxazolyl acetonitrile, tert.-butylbenzoxazolyl acetonitrile, phenylbenzoxazolyl acetonitrile, naphthoxazolyl acetonitrile, cyanoethylbenzoxazolyl acetonitrile, ethoxycarbonylethylbenzoxazolyl acetonitrile, ethoxycarbonylmethylbenzoxazolyl acetonitrile, nitrobenzoxazolyl acetonitrile, dichlorobenzoxazolyl acetonitrile, methylbenzoxazolyl acetate, benzthiazolyl acetonitrile, chlorobenzthiazolyl acetonitrile, dichlorobenzthiazolyl acetonitrile, methylbenzthiazolyl acetonitrile, dimethylbenzthiazolyl acetonitrile, nitrobenzthiazolylacetonitrile, chloromethylbenzthiazolyl acetonitrile, naphthiazolyl acetonitrile, benzthiazolyl acetate, methylbenzthiazolyl acetate and benzthiazolyl acetamide.

Suitable solvents are all solvents which are stable to acids. On the one hand it is possible to use watermiscible solvents, for example alcohols (methanol, ethanol, isopropyl alcohol), for example dioxane, methoxyethanol, ethoxyethanol, 1,2-dimethoxyethane, dimethyl formamide, tetramethyl urea, sulpholane (tetramethylene sulphur dioxide), tris(dimethylamino)-phosphate, dimethyl sulphoxide. Mixtures of the aforementioned solvents can also be used. On the other hand it is also possible to use water-immiscible solvents, such as benzene, toluene or xylene, aliphatic and aromatic chlorinated hydrocarbons, such as carbon tetrachloride, trichloroethylene, ethylene chloride, methylene chloride, chloroform, trichloroethane, tetrachloroethane, perchloroethylene, mono- or dichlorobenzene.

When using water-immiscible solvents, two-phase mixtures are obtained when an aqueous acid, for example aqueous hydrochloric acid, is added.

The amount of solvent used as reaction medium depends on the respective reaction substrate and is chosen solely in accordance with technical (for example good stirribility) and economic (good space-time yields) aspects.

The condensation of compounds I and II is carried out at temperatures between 0° and 100° C., preferably between 20° and 70° C. As a rule as low a temperature as possible will be chosen.

Suitable acid catalytics are primarily mineral acids, such as hydrohalic acids, sulphuric acid and phosphoric acid, and also strong organic acids, such as formic acid, acetic acid or chloroacetic acid. Preferably aqueous hydrochloric acid is used. If compounds of the formula I, in which R represents a cyano or amide group, are used as starting materials, then it is necessary to add the requisite stoichiometric amount of acid to neutralise the ammonia or amine which is set free during the condensation with the aldehyde of the formula (II).

Particularly preferred starting materials and intermediates are those which are derived from aminothiophenols and give benzthiazolyl compounds, i.e. those in which Y is a sulphur atom.

Exceptionally good yields of the heterocyclic products of the formula (I), which can be further condensed direct without isolation to give the dyes of the formula (III), are obtained in particular from malonic dinitrile and o-aminothiophenols. It is therefore possible to obtain the dyes of the formula (III) which contain a benzthiazolyl group direct and in good yield by carrying out the reaction in two steps consecutively in the same reaction vessel. The partial steps described above and the last mentioned combined two-step reaction constitute particularly preferred embodiments of the invention for which protection is sought.

The dyestuffs obtained according to the instant process are valuable disperse dyestuffs which give fast yellow shades on polyester fibers.

The invention is illustrated by the following Examples, in which the parts and percentages are by weight unless otherwise stated.

EXAMPLE 1

3.4 Parts of 2-cyanomethyl-5-methylbenzoxazole and 3.9 parts of diethylaminosalicyl aldehyde in 22 parts of methanol are treated at room temperature with 3.7 parts of conc. hydrochloric acid. The mixture is stirred for 4 hours at 67° C., buffered with sodium acetate and further stirred for 1 hour. After cooling, filtration, and drying, 3.2 parts of a dye of the formula

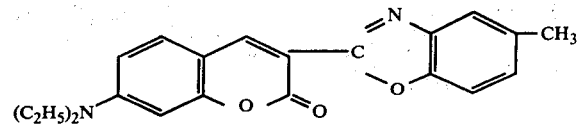

are obtained, which dyes polyester fibres in yellow shades.

EXAMPLE 2

4.8 Parts of diethylaminosalicyl aldehyde and 4.4 parts of benzthiazolyl acetonitrile in 25 parts of methanol are treated at room temperature with 4.5 parts of conc. hydrochloric acid. The mixture is stirred for 3½ hours at 65° C. to 70° C. are subsequently treated with 2 parts of sodium acetate crystals. After stirring for a further hour at 65° to 70° C., the suspension is cooled to room temperature and filtered. The residue is washed firstly with methanol, then with water, and dried to yield 8.4 parts of a dye of the formula

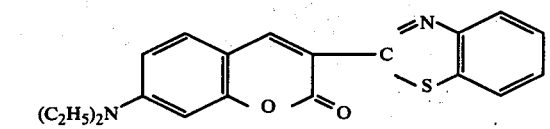

which dyes polyester fibres in yellow shades.

EXAMPLE 3

4.8 Parts of diethylaminosalicyl aldehyde and 4.4 parts of benzthiazolyl acetonitrile are suspended in 30 parts of chlorobenzene and the suspension is treated with 17 parts of conc. hydrochloric acid. After the mixture has been stirred for 3 hours at 90° C., it is cooled and filtered. The residue is washed neutral with water and dried to yield 7.3 parts of the same dye as that obtained in Example 2.

The same dye is also obtained by using benzthiazolyl acetate or benzthiazolyl acetamide instead of benzthiazolyl acetonitrile.

EXAMPLE 4

1.65 Parts of malodinitrile in 25 parts of methanol are treated with one drop of aqueous ammonia and, under nitrogen, with 3.1 parts of o-aminothiophenol at a maximum temperature of 30° C. After the mixture has been stirred for 1 hour at room temperature, it is neutralised at a maximum temperature of 30° C. with 2.5 parts of conc. hydrochloric acid and thereafter treated with 4.8 parts of diethylaminosalicyl aldehyde. After addition of a further 4.5 parts of conc. hydrochloric acid, the mixture is heated for 3½ hours to 65° to 70° C. and then 2 parts of sodium acetate crystals are added. After stirring for a further hour at 65° to 70° C., the mixture is cooled and filtered. The residue is washed with water and dried and consists of 7.6 parts of the dye of the formula

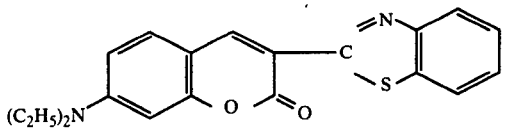

I claim:

1. A process for the manufacture of coumarin dyes of the formula

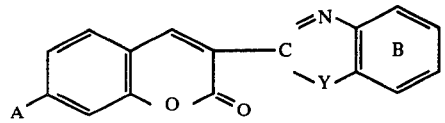

wherein Y represents a sulphur or an oxygen atom and the ring B can carry non-ionogenic substituents selected from the group consisting of nitro, lower alkyl or lower alkyl substituted by one or more halogen atoms, lower alkoxy, hydroxyl, cyano, vinyl, amino, lower alkylamino, phenyl, phenoxy, acyl, acyloxy or acylamino, and A represents a hydrogen atom, a hydroxyl, alkoxy or phenoxy group, or represents a group —$NR_1R_2$, in which $R_1$ represents lower alkyl or phenyl or lower alkyl or phenyl substituted by one or more halogen, lower alkoxy, hydroxyl, cyano, vinyl, amino, lower alkylamino, phenyl, phenoxy, acyl, acyloxy or acylamino, $R_2$ represents a hydrogen atom or has one of the meanings assigned to $R_1$, or $R_1$ and $R_2$ together with the nitrogen atom to which they are attached represent piperidine, piperazine, N-acylpiperazine, pyrrolidine, morpholine or N-alkylpiperazine, which process comprises condensing heterocyclic products of the formula

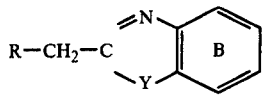

wherein R represents a —CN— —COOR' or

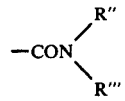

group, in which R' represents unsubstituted alkyl or aryl or substituted alkyl or aryl substituted by one or more halogens, lower alkoxy, hydroxyl, cyano, vinyl, amino, lower alkylamino, phenyl, phenoxy, acyl, acyloxy or acylamino, and each of R" and R''' independently can be the same as R' or a hydrogen atom, and Y and B are as defined above, with the proviso that, if Y represents a sulphur atom, the reaction mixture consisting of malodinitrile and o-aminothiophenols is used as starting material, in the presence of an organic solvent and a catalytic amount of a strong acid, with an aldehyde of the formula

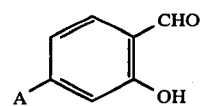

wherein A is as defined above.

2. A process according to claim 1, wherein the starting materials are compounds in which A represents a group of the formula

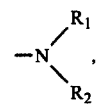

in which $R_1$ and $R_2$ represent lower alkyl or lower alkyl substituted by one or more halogen, lower alkoxy, hydroxyl, cyano, vinyl, amino, lower alkylamino, phenyl, phenoxy, acyl, acyloxy or acylamino.

3. A process according to claim 2, wherein $R_1$ and $R_2$ represent lower alkyl groups which can be substituted by chlorine, bromine, hydroxyl, cyano, lower alkylcarbonyloxy, lower alkylcarbonylamino, formyloxy, lower alkoxycarbonyloxy or lower alkoxycarbonyl.

4. A process according to claim 2, wherein $R_1$ and $R_2$ together with the nitrogen atom to which they are attached form a piperidine, piperazine, morpholine or pyrrolidine ring system.

5. A process according to claim 1, wherein the starting materials are heterocyclic compounds in which Y represents a sulphur atom.

6. A process according to claim 1, wherein an aqueous mineral acid is used as acid.

7. A process according to claim 6, wherein aqueous hydrochloric acid is used as acid.

8. A process according to claim 5, wherein the starting material is a reaction mixture which contains 2-cyanomethylbenzthiazoles and which has been obtained, without purification, from the condensation of malodinitrile and o-aminothiophenols.

* * * * *